United States Patent
Ben-David et al.

(10) Patent No.: US 7,376,106 B2
(45) Date of Patent: May 20, 2008

(54) CODE-DIVISION-MULTIPLE-ACCESS (DS-CDMA) CHANNELS WITH APERIODIC CODES

(75) Inventors: Shay Ben-David, Haifa (IL); Ehud Karnin, Koranit (IL); Jacob Sheinvald, Nofit (IL)

(73) Assignee: International Business Machines Corporation, Armonk, NY (US)

( * ) Notice: Subject to any disclaimer, the term of this patent is extended or adjusted under 35 U.S.C. 154(b) by 1041 days.

(21) Appl. No.: 10/306,916

(22) Filed: Nov. 27, 2002

(65) Prior Publication Data

US 2004/0100928 A1 May 27, 2004

(51) Int. Cl.
*H04B 7/00* (2006.01)
*H04B 7/216* (2006.01)

(52) U.S. Cl. .................. 370/335; 370/310; 370/329; 455/562.1

(58) Field of Classification Search .................. None
See application file for complete search history.

(56) References Cited

U.S. PATENT DOCUMENTS

| | | | |
|---|---|---|---|
| 6,377,416 B1 * | 4/2002 | Kikuta ................ 360/77.02 |
| 6,515,593 B1 * | 2/2003 | Stark et al. ............ 340/870.07 |
| 6,697,347 B2 * | 2/2004 | Ostman et al. ............ 370/335 |
| 6,839,573 B1 * | 1/2005 | Youssefmir et al. ...... 455/562.1 |
| 6,907,270 B1 * | 6/2005 | Blanz .................... 455/562.1 |
| 6,930,991 B2 * | 8/2005 | Ozluturk .................. 370/335 |

\* cited by examiner

*Primary Examiner*—Duc M. Nguyen
*Assistant Examiner*—Matthew Genack

(57) ABSTRACT

A method for channel estimation, includes receiving an input signal due to a superposition of waveforms encoding symbols transmitted respectively by a plurality of transmitters in a common frequency band. Each transmitter among the plurality of transmitters modulates the symbols with a respective spreading code. The input signal is sampled at sampling intervals over the duration of an observation period, thus providing a sequence of samples. The sequence of complex samples is processed to estimate a channel response for each of the transmitters by maximizing, individually for each of the transmitters and based on the respective spreading code of the transmitter, a likelihood of correctly decoding the transmitted symbols using the estimated channel response.

38 Claims, 9 Drawing Sheets

CODE-DIVISION-MULTIPLE-ACCESS (DS-CDMA) CHANNELS WITH APERIODIC CODES

FIELD OF THE INVENTION

The present invention relates generally to digital signal processing, and specifically to methods and systems for simultaneous reception and processing of signals from multiple transmitters sharing a common frequency band using code-division multiple access (CDMA).

BACKGROUND OF THE INVENTION

CDMA is widely used in cellular and other wireless systems for multiplexing communications among multiple users on a common frequency band. In direct-sequence (DS) CDMA, the transmitter multiplies each user's signal by a distinct code waveform. The code waveforms of the different users have the form of "pseudo-noise" (PN) sequences, also known as spreading codes, and are chosen so as to be as much as possible mutually orthogonal. The receiver receives a composite signal made up of the sum of all of the users' signals, which overlap in time and frequency. To recover the individual signal of a given user, the receiver correlates the composite signal with that user's distinct code.

Multiple access interference (MAI) limits the capacity and performance of DS-CDMA systems. MAI results from the lack of complete orthogonality between the spreading codes, due to random time offsets between the signals of different users, for example. MAI becomes increasingly problematic as the number of interfering users and their power increases, particularly when there are power imbalances among the users. These imbalances typically result from differences in distance between the users and the base station, as well as from fading and other factors that affect signal power. The problems caused by MAT have led a number of groups to develop multi-user detection techniques, in which information about multiple users and their respective code waveforms is used jointly to better detect each individual user. A survey of these techniques is presented by Moshavi in "Multi-User Detection for DS-CDMA Communications," *IEEE Communications Magazine* (October, 1996), pages 124-136, which is incorporated herein by reference.

To formulate the multi-user detection problem, we consider a CDMA receiver that receives signals from K users. The received complex-envelope baseband signal $x(t)$ is a superposition of the users' individual signal waveforms, including channel distortion and additive noise $n(t)$:

$$x(t) = \sum_{k=1}^{K} h_k(t) * \xi_k(t) + n(t) \tag{1}$$

Here "*" denotes convolution, and $h_k(t)$ is the impulse response of the kth user channel (including delay, attenuation, multipath and filtering effects). In the derivation that follows, $n(t)$ is assumed to be Gaussian with mean zero and without correlation between successive noise samples.

The kth user's signal waveform is given by:

$$\xi_k(t) = \sum_{m=-\infty}^{\infty} b_k(m) p_{T_b}(t - mT_b) c_k(t) \tag{2}$$

In this equation, $b_k(m)$ is the mth symbol transmitted by the kth user, wherein $b_k$ is selected from a predefined constellation (or alphabet) A. In phase-shift keyed (PSK) modulation, the alphabet set lies on the unit circle in the complex plane. For example, in quadrature phase shift keying (QPSK), $A=\{-1, -j, 1, j\}$. For binary phase shift keying (BPSK), which is currently the most common modulation scheme in current cellular systems, $b_k$ is a bit selected from $A=\{-1,1\}$. $T_b$ is the symbol duration, and $p_T(t)$ is a rectangular pulse with unity value in $t \in [0,T)$, and zero elsewhere. $c_k(t)$ is a complex-valued PN spreading waveform, with a chip period $T_c=T_b/N$, wherein N is the spreading response of the DS modulation:

$$c_k(t) = \sum_{i=-\infty}^{\infty} \frac{1}{\sqrt{2}} [\gamma_k^{(I)}(i) + j\gamma_k^{(Q)}(i)] p_{T_c}(t - iT_c) \tag{3}$$

$\gamma_k^{(I)}(i)$ and $\gamma_k^{(Q)}(i)$ are independently drawn from $\{-1,1\}$ with uniform distribution.

The multi-user detection problem can be stated as follows: Let the received signal $x(t)$ be sampled, and assume that the impulse responses $h_k(t)$ and the spreading waveforms $c_k(t)$ are known. Now estimate the symbols $b_k(m)$ from the samples $x(t)$ for all k and m. For the sake of simplicity in framing the problem, it is assumed that the impulse responses of the channels can be expressed as complex scalars $h_k$, that the user signals are mutually synchronized, and that the samples are taken at mid-chip, at a sampling rate equal to the chip rate (i.e., N samples per symbol). It is possible to relax some of these assumptions and still achieve multi-user detection, as described hereinbelow.

The symbols transmitted by the K users at symbol interval m can be written as a K×1 real vector:

$$b(m):=(b_1(m), \ldots b_K(m))^T \tag{4}$$

The samples taken during the mth symbol interval can be arranged as a N×1 complex vector $x(m)$. Rearranging equations (1) and (2) in similar vector form gives the following expression:

$$x(m)=S(m)b(m)+n(m) \tag{5}$$

Here $n(m)$ is a N×1 complex vector of noise samples. $S(m)$ is a complex N×K matrix, whose kth column is a signature vector $s_k(m)$ representing the "symbol signature" of the kth user during the mth symbol interval. The elements of the signature vectors $s_k(m)$ are samples of the following waveform:

$$s_k(t;m):=h_k c_k(t), \ mT_b \leq t \leq (m+1)T_b \tag{6}$$

Given the known elements of $x(m)$ and $S(m)$, in order to solve the multi-user detection problem it is necessary to find the elements of $b(m)$ that best satisfy equation (5). An optimal, maximum-likelihood solution to this problem was framed by Verdu in "Minimum Probability of Error for Asynchronous Gaussian Multiple-Access Channels," *IEEE*

*Transactions on Information Theory* 32:1 (January, 1986), pages 85-96, which is incorporated herein by reference. According to this solution, for each m, we find the elements of b within the applicable constellation A that minimize $\|x-Sb\|^2$. (For brevity, here and below, we write simply b, S and x to represent b(m), S(m) and x(m).) Although optimal, this detector is usually impractical, since it requires an exhaustive search over all possible b $\in A^K$.

As a less costly (though suboptimal) alternative, Lupas and Verdu proposed a decorrelating detector in "Linear Multi-User Detectors for Synchronous Code-Division Multiple Access Channels," *IEEE Transactions on Information Theory* 35:1 (January, 1989), pages 123-136, which is also incorporated herein by reference. The decorrelating detector finds a vector b̃ that minimizes $\|x-Sb\|^2$ over $b \in C^K$, wherein C is the complex plane. The "soft decision" vector b̃ is projected onto the constellation $A^K$ to arrive at the hard decision output b̂. For BPSK modulation, the elements $\hat{b}_k$ are given simply by the sign of the real part of the corresponding elements $\tilde{b}_k$. Assuming $K \leq N$ and full column-rank S, the soft decision solution is given by:

$$\tilde{b} = (S^H S)^{-1} S^H x \quad (7)$$

wherein $S^H$ is the conjugate transpose of S.

The decorrelating detector has been found to provide substantial performance responses over conventional single-user detection, with significantly lower computational complexity than the maximum-likelihood detector proposed previously. It performs well even in the presence of substantial power imbalances among the users. It still entails a substantial computational burden, however, in inverting the matrix $S^H S$.

A number of different solutions have been proposed in order to improve multi-user detection performance. For example, Duel-Hallen suggests combining the decorrelating detector with decision feedback, in "Decorrelating Decision-Feedback Multiuser Detector for Synchronous Code-Division Multiple-Access Channel," *IEEE Transactions on Communications* 41:2 (February, 1993), pages 285-290, which is incorporated herein by reference. This detector generates decisions $\hat{b}_k$ iteratively, working down from the stronger user signals to the weaker signals. The decisions made with respect to the stronger users are used in forming decisions for the weaker ones. The decision-feedback detector has been found to outperform the original decorrelating detector as long as the bit-error rate (BER) is not too high, and reliable estimates of the channel responses $h_k$ are available.

Various other technique have been suggested in the patent literature for canceling interference among the signals received from multiple CDMA users. For example, U.S. Pat. No. 5,644,592, to Divsalar et al., whose disclosure is incorporated herein by reference, describes a method of parallel interference cancellation, which estimates and subtracts out all of the interference for each user in parallel. U.S. Pat. Nos. 5,363,403, 5,553,062, 5,719,852 and 6,014,373, all to Schilling et al., whose disclosures are also incorporated herein by reference, describe methods for solving the $(S^H S)^{-1}$ matrix using a fast polynomial expansion.

Multi-user detection methods generally require that the channel responses $h_k$ be known. Typically, the channel responses are not known a priori, but must rather be determined by a suitable channel estimator in the receiver. When short-period, repetitive spreading codes $c_k(t)$ are used, sub-space-based signal array processing techniques can be used to solve the channel estimation problem. Such techniques are described, for example, by Madhow in "Blind Adaptive Interference Suppression for Direct-Sequence CDMA," *Proceedings of the IEEE* 86:10 (October, 1998), pages 2049-2069, which is incorporated herein by reference.

Commercial CDMA standards, such as IS-95, however, use PN spreading codes whose periods are so long that they can be considered purely random for reasonable observation times, rather than repetitive. To address this problem, Torlak et al. offer an iterative approach in "Blind Estimation of FIR Channels in CDMA Systems with Aperiodic Spreading Sequences," *Proceedings of the 31st Asilomar Conference on Signals, Systems & Computers* (Pacific Grove, Calif. November, 1997), which is incorporated herein by reference. According to this approach, the receiver alternately estimates the channel responses and, based on these responses, estimates the transmitted signals, until the estimated signals converge. Weiss et al., in "Channel Estimation for DS-CDMA Downlink with Aperiodic Spreading Codes," *IEEE Transactions on Communications* 47:10 (October, 1999), pages 1561-1569, which is likewise incorporated herein by reference, describe a sub-space approach for finding an initial estimate of the channel responses, followed by an iterative calculation similar to that described by Torlak et al.

SUMMARY OF THE INVENTION

Preferred embodiments of the present invention provide simpler, more efficient methods and systems for estimating channel response and detecting CDMA multi-user symbols, particularly PSK symbols.

In some preferred embodiments of the present invention, the CDMA receiver estimates the channel response $h_k$ for each of the multiple user signals by means of a maximum-likelihood estimator (MLE). The MLE incorporates both the channel responses and the user symbol values as parameters, and then estimates the responses and the symbol values that give the greatest likelihood of being correct. In order to simplify the calculation, the MLE is first decoupled into a set of independent, single-user estimator matrices. Each matrix contains the "fingerprints" of the respective user signals, which are determined by multiplying samples of the received signals x by chip sequences of the user's spreading waveform. The main singular value of each fingerprint matrix is calculated in order to determine an initial estimate of the channel response for each user. These estimated channel responses are used to detect the user signals $\hat{b}_k$, preferably using the multi-user detection method described above. A method of alternate-searching likelihood maximization (ASLM) is used to iteratively refine the estimated channel responses and the detected user signals until both the responses and signal values converge.

The MLE of the present invention enables the receiver to estimate multi-user channel response in CDMA systems that use long (PN) spreading codes with greater accuracy and reduced computational cost than systems known in the art. This MLE works particularly well in conjunction with the multi-user detector described above, in which the transmitted symbols are assumed to lie on the unit circle. The MLE is not limited to this implementation, however, and may likewise be used in conjunction with multi-user detectors of other types, and with symbol constellations that are not restricted to the unit circle.

There is provided, in accordance with a preferred embodiment of the present invention, a method for channel estimation, including:

receiving an input signal due to a superposition of waveforms encoding symbols transmitted respectively by a plurality of transmitters in a common frequency band, wherein each transmitter among the plurality of transmitters modulates the symbols with a respective spreading code;

sampling the input signal at sampling intervals over the duration of an observation period to provide a sequence of samples; and processing the sequence of complex samples to estimate a channel response for each of the transmitters by maximizing, individually for each of the transmitters and based on the respective spreading code of the transmitter, a likelihood of correctly decoding the transmitted symbols using the estimated channel response.

Preferably, processing the sequence of complex samples includes computing respective fingerprints of the transmitters, based on the respective spreading code and the sequence of samples, and determining the channel response for each of the transmitters so as to maximize a product of the respective fingerprints with decision values of the symbols transmitted by the transmitter. Further preferably, determining the channel response includes assembling a respective matrix of the fingerprints for each of the transmitters, and finding a singular value decomposition (SVD) of the respective matrix.

Most preferably, finding the SVD includes deriving a unitary matrix from the matrix of the fingerprints, and estimating the channel response based on the unitary matrix, wherein estimating the channel response includes determining the decision values of the symbols based on the unitary matrix, and computing the estimated channel response from the decision values. Alternatively, estimating the channel response includes computing the estimated channel response based on the unitary matrix and on a singular value determined by the SVD.

In a preferred embodiment, the transmitters transmit known pilot signals in addition to the encoded symbols, and assembling the respective matrix includes augmenting the matrix to account for the pilot signals, and finding the SVD includes computing the SVD of the augmented matrix so as to estimate the channel response using the pilot signals.

In a further preferred embodiment, the symbols belong to a real-valued constellation, and determining the channel response includes maximizing the product of the respective fingerprints with the decision values while restricting the decision values to real values.

Preferably, processing the sequence of complex samples includes estimating a respective delay time for each of the transmitters by maximizing the likelihood of correctly decoding the transmitted symbols over a range of possible delay times.

Further preferably, sampling the input signal includes generating the samples at a sample rate that is substantially equal to a chip rate of the spreading code. Alternatively, sampling the input signal includes generating the samples at a sample rate that is substantially greater than a chip rate of the spreading code.

In a preferred embodiment, receiving the input signal includes receiving the signal through multiple antennas, and processing the sequence of complex samples includes estimating the channel response from each of the transmitters to each of the multiple antennas.

Preferably, processing the sequence of complex samples includes processing the sequence of complex samples using the estimated channel response for all the transmitters to determine decision values corresponding to the symbols transmitted by each of the transmitters, and re-estimating the channel response for each of the transmitters based on the decision values of the symbols. Most preferably, re-estimating the channel response includes iteratively repeating the steps of processing the sequence of complex samples to determine the decision values and re-estimating the channel response until a convergence criterion is satisfied.

Typically, the transmitted symbols belong to a predetermined constellation, and processing the sequence of complex samples to determine the decision values includes finding soft decision values corresponding to the symbols while constraining the soft decision values to a range of values to which the constellation belongs, and projecting the soft decision values onto the constellation to estimate the transmitted symbols. In a preferred embodiment, the constellation is real-valued, and constraining the soft decision values includes requiring the soft decision values to be real. In another embodiment, the symbols in the constellation have a fixed magnitude and a variable phase, and constraining the soft decision values includes constraining the soft decision values to a circle in a complex plane.

In a preferred embodiment, the transmitters transmit known pilot signals in addition to the encoded symbols, and processing the sequence of complex samples to estimate the channel response includes estimating the channel response using the pilot signals, while processing the sequence of complex samples to determine the decision values includes estimating the decision values independent of the pilot signals.

There is further provided, in accordance with a preferred embodiment of the present invention, a multi-user receiver, including:

input circuitry, coupled to receive an input signal due to a superposition of waveforms encoding symbols transmitted respectively by a plurality of transmitters in a common frequency band, wherein each transmitter among the plurality of transmitters modulates the symbols with a respective spreading code, and to sample the input signal at sampling intervals over the duration of an observation period to provide a sequence of samples; and channel estimation circuitry, coupled to receive and process the sequence of complex samples so as to estimate a channel response for each of the transmitters by maximizing, individually for each of the transmitters and based on the respective spreading code of the transmitter, a likelihood of correctly decoding the transmitted symbols using the estimated channel response.

The present invention will be more fully understood from the following detailed description of the preferred embodiments thereof, taken together with the drawings in which:

DETAILED DESCRIPTION OF PREFERRED EMBODIMENTS

System Overview

Figure 1:
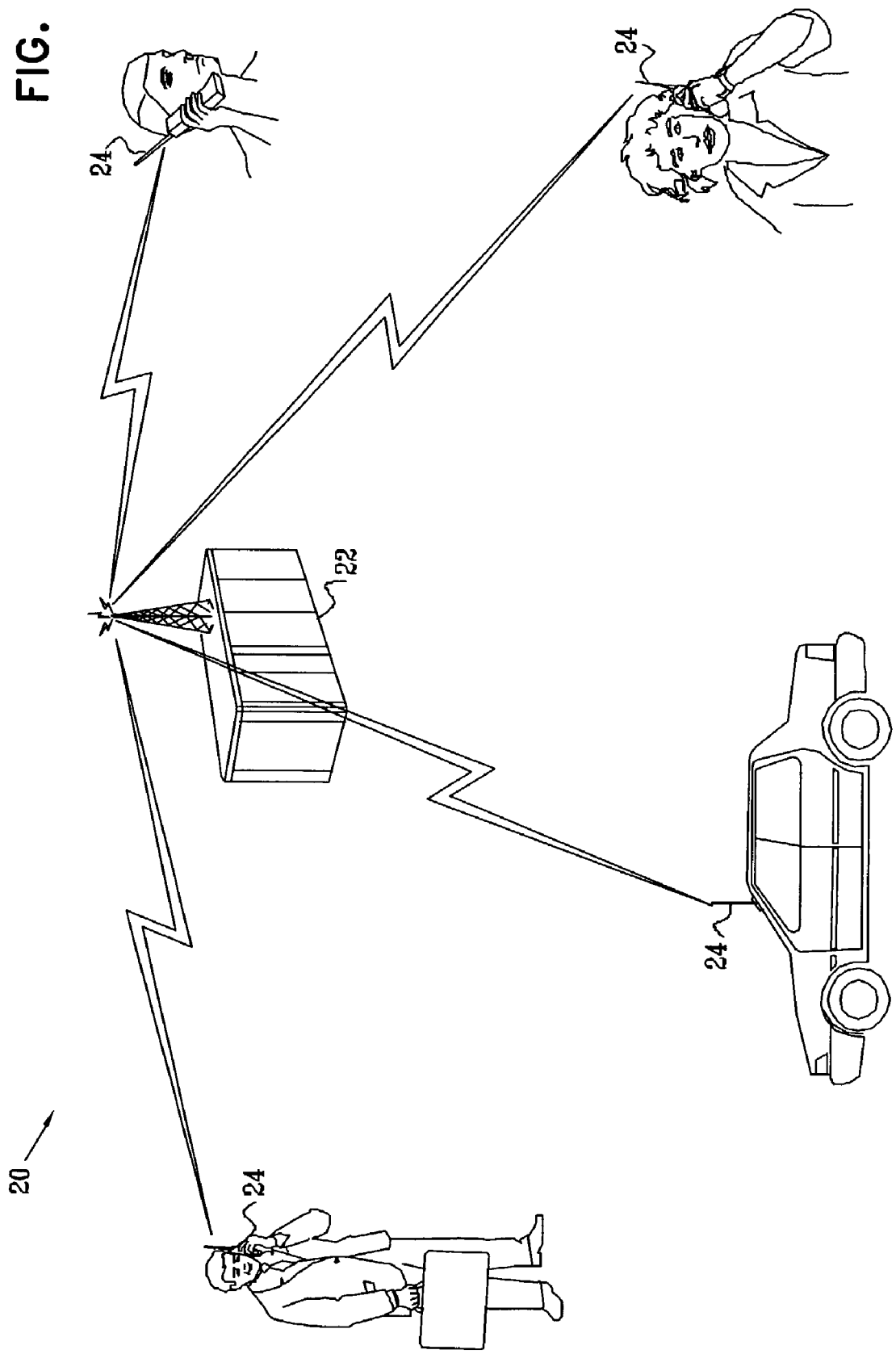
FIG. 1 is a schematic, pictorial illustration of a multi-user communication system, in accordance with a preferred embodiment of the present invention.

FIG. 1 is a schematic, pictorial illustration of a wireless communication system 20, typically a cellular system, in accordance with a preferred embodiment of the present invention. A base station 22 transmits downlink signals to a plurality of users 24, and receives uplink signals from the users in return. The signals are modulated using a DS-CDMA scheme, with PSK modulation, as described in the Background of the Invention. In order to separate and process the signals that it receives from multiple users 24, base station 22 employs a novel detection scheme using a constrained statistical model, as described in detail hereinbelow.

Figure 2:
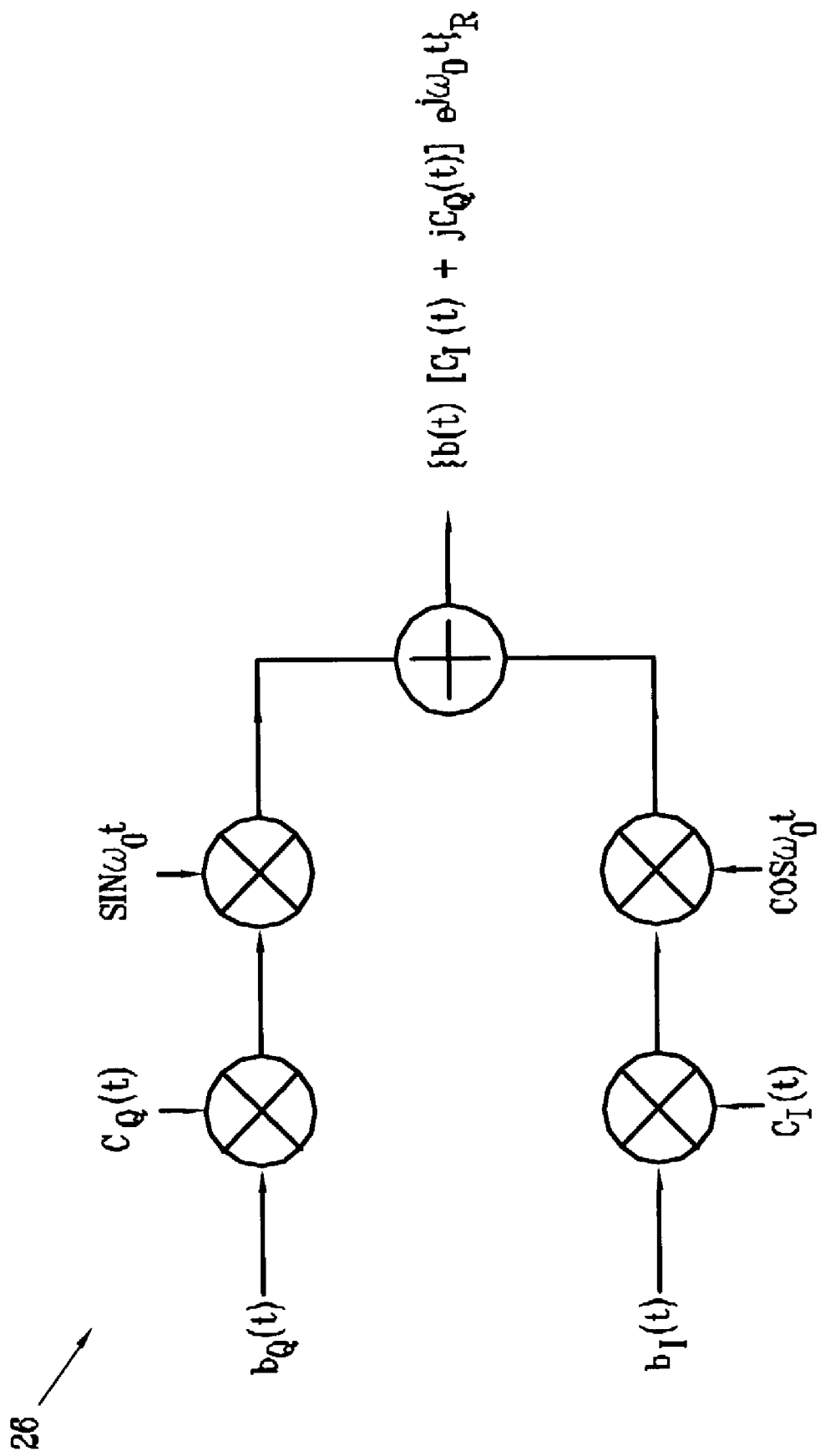
FIG. 2 is a block diagram that schematically illustrates a transmitter operated by a user in the system of FIG. 1.

FIG. 2 is a block diagram that schematically illustrates elements of a transmitter 26 operated by users 24 in system 20. The operation of this transmitter is represented mathematically by equations (2) and (3) above. Each symbol b(t) to be transmitted is multiplied by a complex PN spreading waveform, with different real (I) and imaginary (Q) parts $C_I(t)$ and $C_Q(t)$, respectively. In the general case of PSK, b(t) has real and imaginary parts, as well, $b_I(t)$ and $b_Q(t)$. In the specific case of real-valued modulation, such as BPSK, $b_I(t)=b_Q(t)$. The output of transmitter 26 is a complex-valued signal $b(t)[C_I(t)+jC_Q(t)]e^{j\omega_0 t}$, wherein $\omega_0$ is the carrier frequency.

Figure 3:
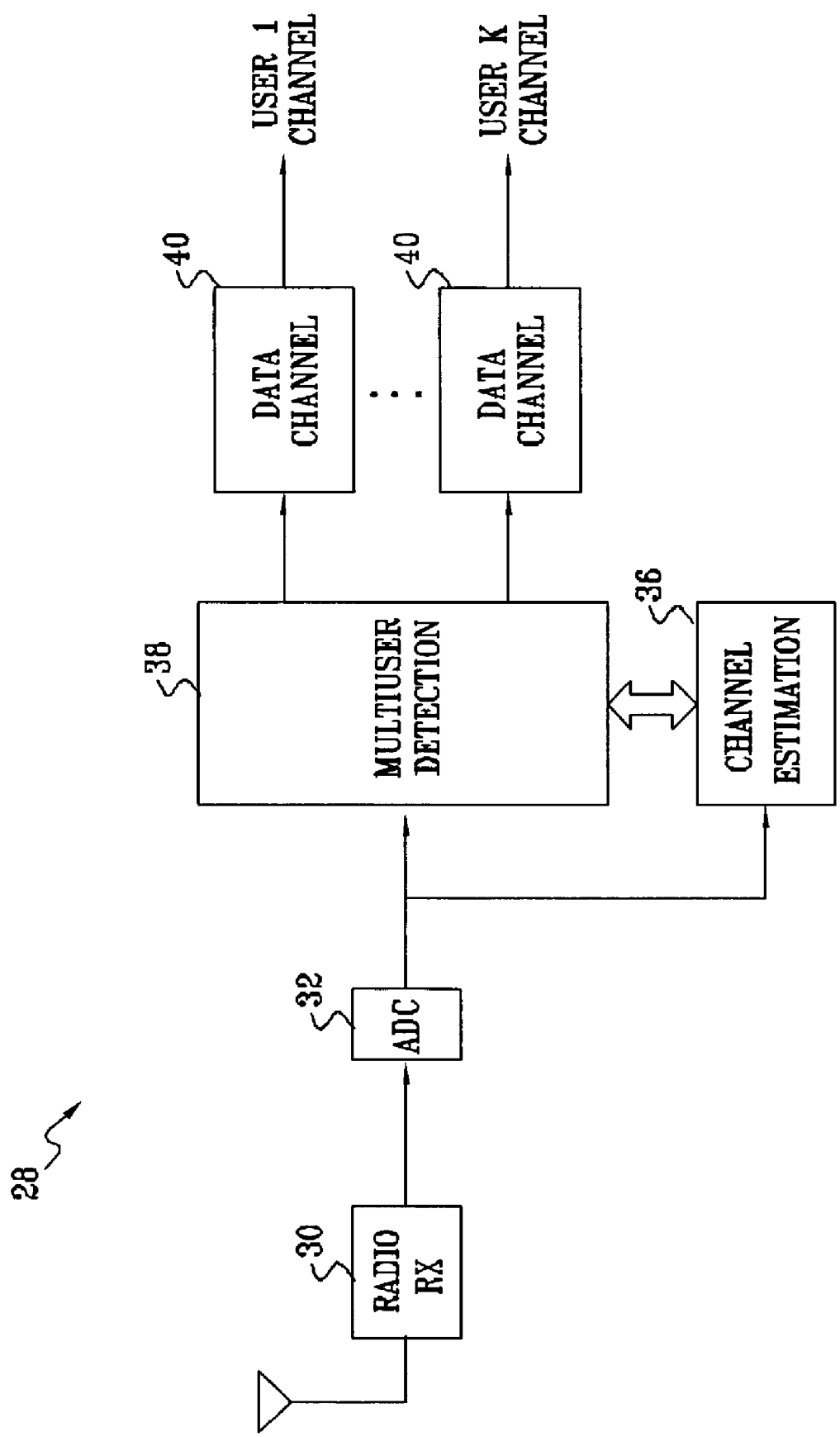
FIG. 3 is a block diagram that schematically illustrates a receiver with multi-user detection capability, in accordance with a preferred embodiment of the present invention.

FIG. 3 is a block diagram that schematically illustrates a receiver 28 used in base station 22 for demodulating and decoding the signals from transmitters 26, in accordance with a preferred embodiment of the present invention. The signals are received over the air and downconverted to baseband by a radio receiver front end 30. The baseband signals are then digitized by an analog/digital converter (ADC) 32. The design and operation of these elements are well known in the art, as are those of other elements typically used in base station receivers, which would normally be included in receiver 28 but are omitted here for the sake of brevity.

Front end 30 and ADC 32 provide an input to a channel estimator 36 and to a multi-user detection block 38 that is substantially of the form given by equation (1). The channel estimator estimates the respective impulse responses (or channel responses) $h_k(t)$ of the user channels. Multi-user detection block 38 uses the channel response estimates to processes the superposed signal x(t) of all of users 24, modulated by the respective PN complex signatures of the users, in order to estimate an individual symbol stream $\hat{b}_k(m)$ for each user. The estimated user symbol streams generated by multi-user detection block 38 are input to an individual data processing block 40 for each user. This block performs further data decoding and control channel processing, as is known in the art. The operation of blocks 40 is outside the scope of the present invention.

The novel operations of both channel estimator 36 and multi-user detection block 38 are described in detail hereinbelow. Typically, estimator 36 and block 38 comprise one or more digital signal processor circuits, comprising a single dedicated chip or a group of chips that are configured to carry out the methods described below. Alternatively or additionally, some or all of the functions of estimator 36 and block 38 may be carried out in software on a suitable general-purpose microprocessor. Still further alternatively or additionally, certain digital processing functions of estimator 36 and block 38 that are described below may equivalently be accomplished in the analog domain using suitable matched filters, as are known in the art. All these various implementations will be apparent to those skilled in the art and are considered to be within the scope of the present invention.

It should be noted that channel estimators in accordance with the principles of the present invention may also be used in other receivers and in conjunction with multi-user detectors of other types, and not only with multi-user detection block 38. Similarly, the multi-user detection block may receive its channel response estimates from sources other than channel estimator 36, including other types of channel estimators, as are known in the art.

Multi-User Detection By Constraining Soft Decisions to the Unit Circle

Multi-user detection block 38 solves equation (5), above, by constraining the soft decision values $\hat{b}_k$ to the unit circle. This constraint is equivalent to substituting:

$$b_k = e^{j\phi_k} \tag{8}$$

The model of equation (8) permits equation (5) to be restated as follows in terms of a cost function $f(\phi)$ and a vector $\phi$ of the phases of the soft decision values:

$$f(\phi) = \|x - Se^{j\phi}\|^2 \tag{9}$$

$$e^{j\phi} = (e^{j\phi_1}, \ldots, e^{j\phi_K})^T$$

The soft decision values $\hat{b}_k$ are then determined by minimizing $f(\phi)$ over $\phi$.

Because $\hat{b}$ is constrained to the unit circle, the number of real parameters that must be solved for in equation (8) is only half the number used in methods known in the art, as exemplified by the more general equation (5). Detection block 38 must estimate only the phase angles of $\hat{b}_k$, and not the amplitudes. In other words, it is evident from this analysis that, at least where PSK modulation is concerned, methods known in the art use an over-parameterized model for their solution. Over-parameterization tends to increase estimation error, and the inventors have indeed found that in most cases, the constrained detector implemented in block 38 achieves a lower bit-error rate (BER) than do decorrelating detectors known in the art. The reduction in the number of parameters also reduces the computational cost of the detector geometrically, so that the cost of implementing block 38 is considerably less than that of a conventional decorrelating detector for the same number of users. On the other hand, because the number of real unknowns in equation (8) is reduced by half, the usual constraint in decorrelating detectors that the number of users K cannot exceed N is now relaxed to $K \leq 2N$, permitting receiver 28 to handle twice the number of users as could be detected by a conventional decorrelating detector with the same spreading gain.

Figure 4:
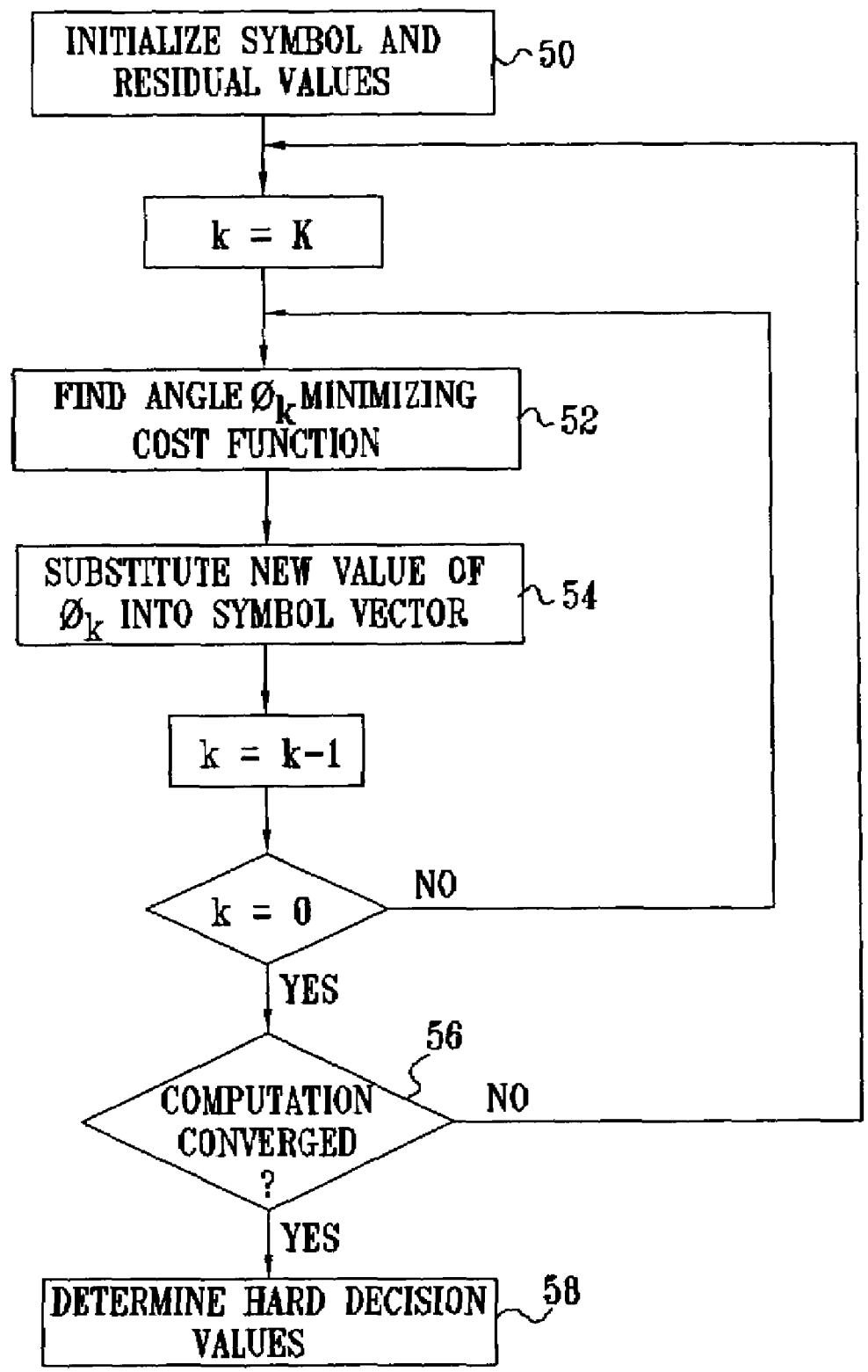
FIG. 4 is a flow chart that schematically illustrates a method for multi-user detection based on alternating phase searching (ALPS), in accordance with a preferred embodiment of the present invention.

FIG. 4 is a flow chart that schematically illustrates a method for multi-user detection implemented by block 38, in accordance with a preferred embodiment of the present invention. The method performs an alternating phase search (ALPS) to iteratively reduce the cost function f along each of the axes $\{\phi_k\}$. Rearranging equation (9), it can be shown that at any step of the iteration, the value of $\phi_k$ that will minimize f is given by:

$$\phi_k = \text{angle}(s_k^H x^{(k)}) \qquad (10)$$

wherein $s_k$ is the k-th column of S, and $x^{(k)}$ is defined by:

$$x^{(k)} = x - S e^{j\phi_k} \qquad (11)$$

To begin the ALPS procedure, the entries of $\phi$ (i.e., the estimated symbol values of b) are set to some initial values, at an initialization step 50. A useful method for initialization is described below with reference to FIG. 6. The estimated user signals are preferably ordered according to the approximate strengths of the signals, from weakest ($x_1$) to strongest ($x_K$). It is also useful to introduce and initialize a residual vector r, given by:

$$r = x - S\tilde{b} \text{ wherein } \tilde{b} = e^{j\phi} \qquad (12)$$

Detection block 38 then iterates through the users, preferably beginning with the strongest user signal (user K), finding for each user k the angle $\phi_k$ that will minimize f, as given by equation (10), at an angle determination step 52. After each angle $\phi_k$ is calculated, the new value is substituted into $\tilde{b}$, at a substitution step 54, for use in calculating $\phi_k$ for the subsequent users in the iteration. The residual vector r is updated at the same time. Using the definitions of equations (10), (11) and (12), the computations of steps 52 and 54 can be expressed as follows:

$$\tilde{b}_k \leftarrow \omega(s_k^H r + \|s_k\|^2 \tilde{b}_k)$$

$$r \leftarrow r + x_k(\tilde{b}_k^{(old)} - \tilde{b}_k) \qquad (13)$$

Here the operator $\omega( )$ projects its argument onto the unit circle. $\tilde{b}_k^{(old)}$ represents the value of $\tilde{b}_k$ prior to the current update.

After this procedure has been carried out for all the users, detection block 38 checks the results to determine whether the computation has converged, at a convergence checking step 56. Convergence may be inferred, for example, when the differences between the previous and current soft decision values ($\tilde{b}_k$) drop below a predetermined threshold. Until convergence is reached, block 38 repeats the iteration of steps 52 and 54.

Once the soft decision values have converged, block 38 converts them to the nearest elements of the constellation alphabet A, in a hard decision step 58. At this step, the detection block iterates through the user soft decision values, from the strongest to the weakest, to determine the hard decision values:

$$\tilde{b}_k \leftarrow \alpha(s_k^H r + \|s_k\|^2 \tilde{b}_k) \qquad (14)$$

$$r \leftarrow r + s_k(\tilde{b}_k - \tilde{b}_k)$$

Here the operator $\alpha( )$ projects the soft decisions onto the nearest alphabet members, taking into account the residual r (which is adjusted after each step in the iteration). The final residual gives an estimate of the noise vector $\hat{n}$.

Figure 5:
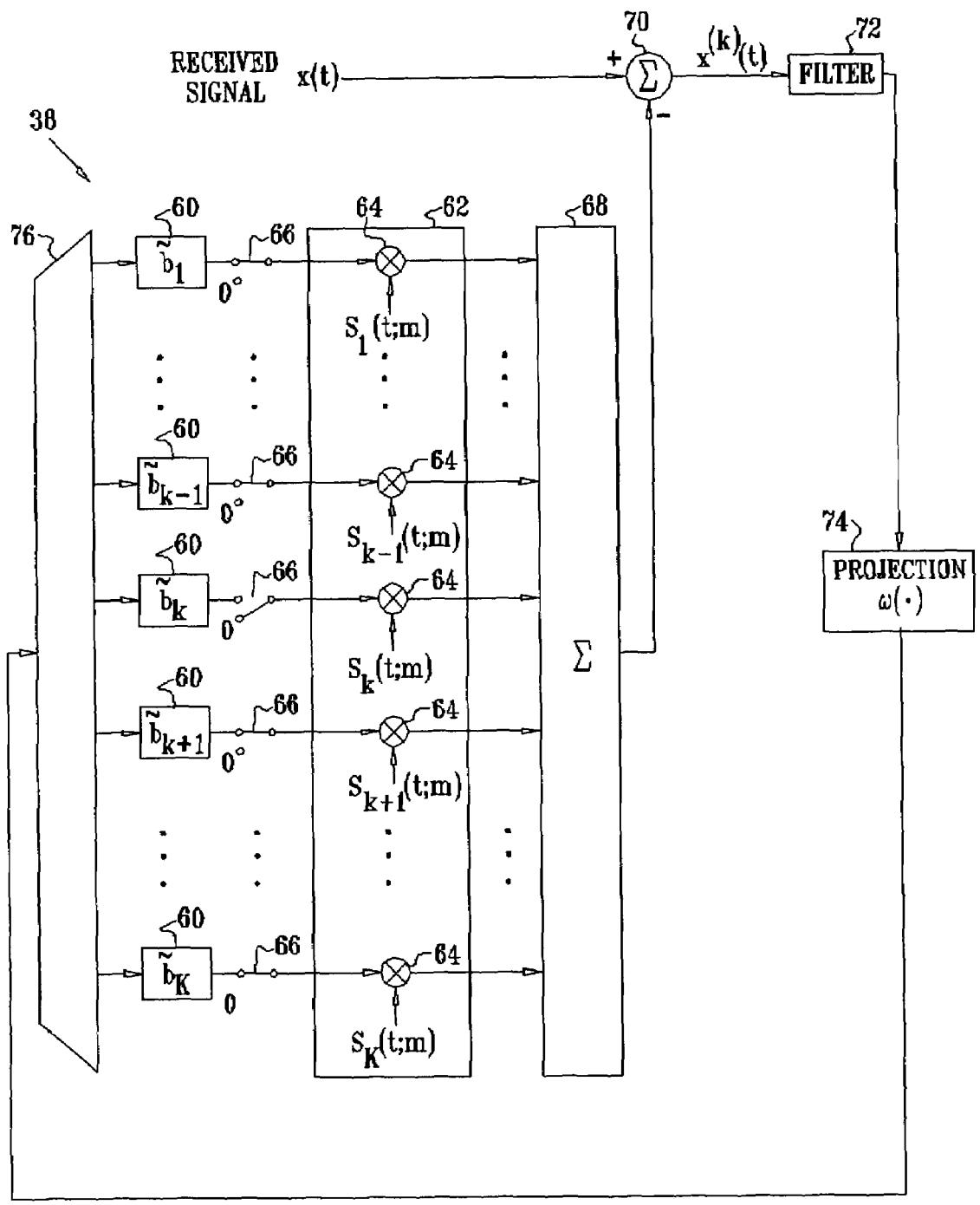
FIG. 5 is a block diagram that schematically illustrates a multi-user detection circuit based on alternating phase searching (ALPS), in accordance with a preferred embodiment of the present invention.

FIG. 5 is a block diagram showing a part of detection block 38, including a circuit suitable for carrying out the method of FIG. 4, in accordance with a preferred embodiment of the present invention. Current soft decision values $\tilde{b}_k$ are held in respective registers 60. At each iteration of the procedure, a spreader 62, comprising a bank of multipliers 64, multiplies each soft decision value by the respective entries of matrix S, except for the soft decision value for user k, which is currently being updated. The choice of k at each iteration is determined by a bank of switches 66, as shown in the figure. An adder 68 sums the products of multipliers 64 to give the current value of $s_k e^{j\phi_k}$. A second adder 70 subtracts this current value from the received signal x(t) to give $x^{(k)}(t)$, as defined above.

A matched filter 72 holding the current values of the elements of matrix S multiplies $x^{(k)}(t)$ to give the result $s_k^H x^{(k)}$ derived above. A projector 74 projects this result onto the unit circle to give the new estimate of the soft decision value $\tilde{b}_k = e^{j\phi_k}$. A multiplexer 76 enters this value into the appropriate register 60, and the circuit then iterates to user k+1, thus continuing until done.

Figure 6:
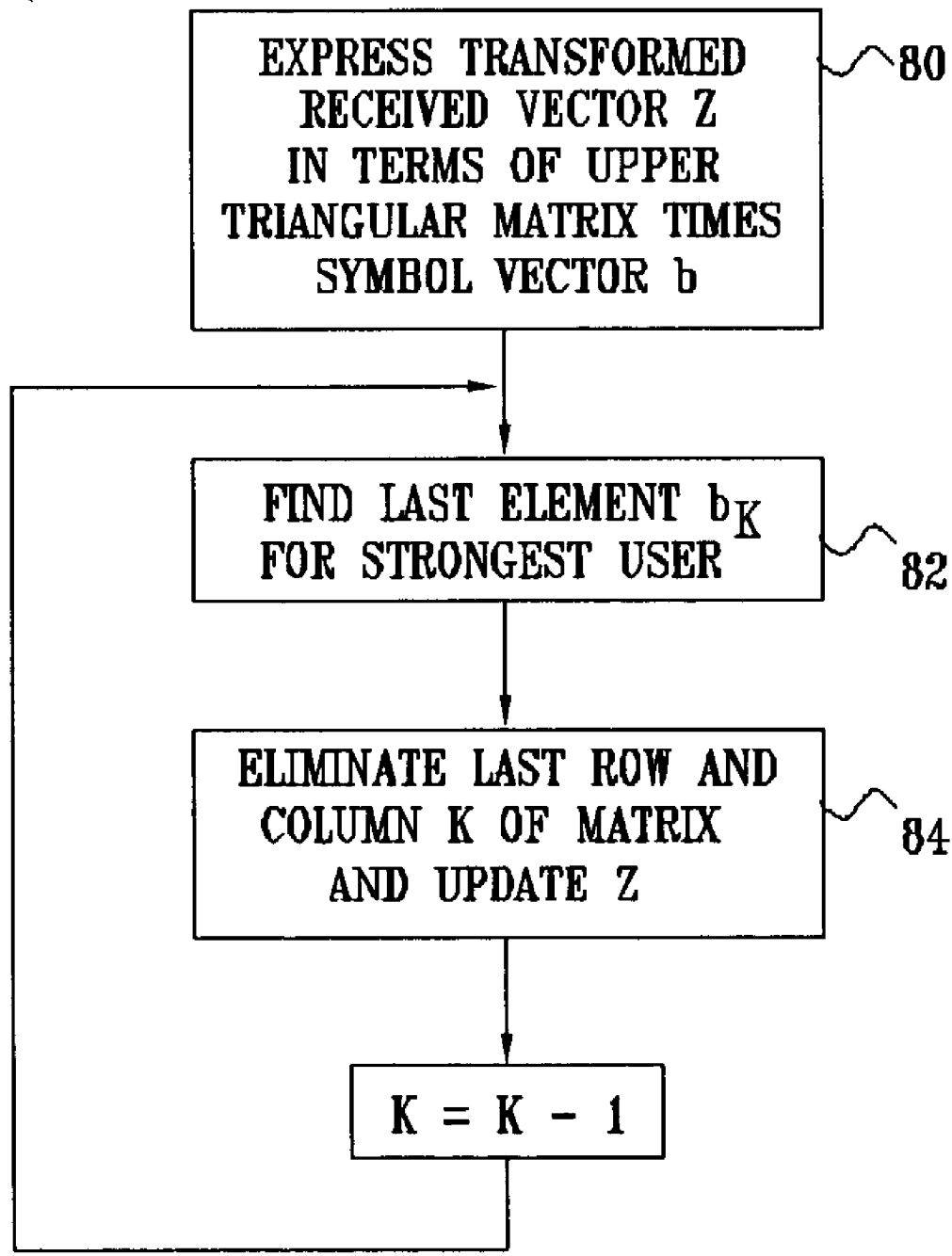
FIG. 6 is a flow chart that schematically illustrates a method for initializing a multi-user detection process, in accordance with a preferred embodiment of the present invention.

FIG. 6 is a flow chart that schematically illustrates a method for initializing the estimated signal values at step 50 of the ALPS procedure, in accordance with a preferred embodiment of the present invention. Substantially any suitable method may be used to set the initial values of b, but the inventors have found the method of FIG. 6 to give generally superior results. The method begins by recasting equation (8) in terms of an upper triangular matrix T, using QR factorization of matrix S, as is known in the art, at a signal recasting step 80. The factorization is preferably performed using successive Givens rotations or Householder transformations of the matrix, as described, for example, by Golub and Van Loan in *Matrix Computations* (Johns Hopkins Series in Mathematical Sciences, 1996), which is incorporated herein by reference. Prior to factorization, the columns of the matrix are preferably ordered according to the approximate strengths of the signals received from the respective users, so that the first column corresponds to the weakest user, and the last column to the strongest.

The QR decomposition at step 80 gives the expression:

$$S = Q T_1 \qquad (15)$$

wherein Q is a N×N unitary matrix, and $T_1$ is a N×K matrix having the structure $$T_1 = \begin{bmatrix} T \\ 0 \end{bmatrix},$$

in which T is a K×K upper-triangular matrix. Q can be partitioned into $Q = [Q_1 \; Q_2]$, wherein $Q_1$ is a N×K matrix having a column span equal to the column span of S, and $Q_2$ is its complement. In practice, explicit computation of Q is preferably avoided, by applying the Givens rotations to the signal vector x, as well as to S.

Substituting the representation of equation (15) into equation (5), we are left with the following model:

$$z = Tb + v_1 \quad (16)$$

wherein $z := Q_1^H x$, and $v_1 := Q_1^H n$. Thus, since $Q_1$ is unitary, the transformed noise vector $v_1$ remains Gaussian and uncorrelated in character.

Because T is upper-triangular, the last component of $\hat{b}$ can be determined simply, at a last element determination step 82, by:

$$\hat{b}_K = \alpha(z_K/T_{KK}) \quad (17)$$

Assuming that the columns of S were properly ordered at step 80, this step should give the symbol value for one of the strongest user signals, so that the likelihood of error in determining $\hat{b}_k$ is relatively small.

The decision value found at step 82 is substituted back into equation (16) to obtain a dimensionally-reduced model, at a row and column elimination step 84:

$$z^{(K-1)} = T^{(K-1)} b^{(K-1)} + v_1^{(K-1)} \quad (18)$$

Here $b^{(K-1)}$ contains the first K−1 components of b, $T^{(K-1)}$ contains the upper-left (K−1)×(K−1) components of T, and the K−1 components of $z^{(K-1)}$ are given by $z_i^{(K-1)} = z_i^{(K)} - T_{iK} \hat{b}_K$. The model of equation (18) is again triangular in structure. Thus, it is now possible to repeat steps 82 and 84, in order to find and eliminate $\hat{b}_{k-1}$. The method then proceeds iteratively in this manner until all of the elements of $\hat{b}$ have been determined.

Having computed z and T in the model of equation (16), it is possible to use these values in place of x and S in the ALPS method of FIG. 4. Because of the triangular structure of T, the computational cost of the ALPS procedure is generally reduced.

The ALPS method of FIG. 4 may be applied to advantage to BPSK modulation (in which A=±1), which is the most commonly-used modulation scheme in currently-deployed CDMA systems. In this case, the alphabet lies both on the unit circle and on the real axis. Therefore, at step 50, the values of b are initialized using a decision-feedback detector in which the decision values are constrained to the real axis. At steps 52 and 54, the soft decision values of b are computed with the unit circle constraint, as described above, after which the final hard decision values are determined by constraining b to the actual, real alphabet.

A real-constrained decision feedback detector, which may be used at step 50, is described in the above-mentioned U.S. patent Ser. No. 09/917,837. This model permits equation (5) to be restated as follows in terms of real values only:

$$\bar{x}(m) = \bar{s}(m)b(m) + \bar{n}(m) \quad (19)$$

This equation uses the notation $$\bar{s} := \begin{bmatrix} s_\Re \\ s_\Im \end{bmatrix},$$

in which $S_\Re$ and $S_\Im$ are the separate real and imaginary parts of S, respectively. Similar notation is used for the complex input signal x and noise n. S and x are replaced by $\bar{S}$ and $\bar{x}$ in the development of equation (16), as described above, and the decision operator $\alpha(\ )'$ is replaced simply by a sign operation (taking the sign of the soft decision to determine the hard decision value). Subject to these changes, the method of FIG. 6 is used to initialize the decision values substantially as described above.

For the purpose of steps 52 and 54, the model of equation (9) is preferably also modified as follows to account for the real constellation:

$$f(\phi) = \|\bar{x} - \bar{S}e^{j\phi}\|^2 \quad (20)$$

Equation (20) combines both the unit circle and real axis constraints that apply to the BPSK constellation. Again, the ALPS procedure may be applied to z and T, as determined by the methods of FIG. 6 using $\bar{S}$ and $\bar{x}$.

Although for the sake of simplicity, equations (8) and (9) relate to samples x(t) collected during a single symbol interval, the method embodied in these equations can readily be extended to multiple successive symbol intervals, i.e., to samples collected over $[0, MT_b)$. Such an extended observation window may be necessary in order to deal with loss of synchronism among the user signals and to deal with impulse responses $h_k(t)$ whose duration is longer than a single chip period (due to multi-path effects, for example). In this case, the model of equations (1) and (2) can be recast in the following form:

$$x(t) = \sum_{k=1}^{K} \sum_{m=-\infty}^{\infty} b_k(m)\check{s}_k(t, m) + n(t) \quad (21)$$

Here the symbol signature waveform $s_k(t;m)$ of equation (6) is replaced by a composite symbol signature waveform, given by:

$$\check{s}_k(t, m) = h_k(t) * [c_k(t)p_{Tb}(t - mT_b)] \quad (22)$$

The composite symbol signature waveform can vary from symbol to symbol and is of finite duration, say $(N+L_k)$ chip intervals. The size of $L_k$ reflects the duration of the impulse responses.

If we now restrict our attention to the particular observation window $[0, MT_b)$, equation (21) can be rewritten as follows:

$$x(t) = \sum_{k=1}^{K} \sum_{m} b_k(m)s_k(t; m) + n(t), \quad 0 \le t < MT_b \quad (23)$$

wherein $s_k(t; m) := \check{s}_k(t; M)p_{MTb}(t)$, and the summation in m is over all the symbols having non-zero truncated signatures $s_k(t;m)$ in the observation window. Ordering the symbols according to their signature-start-times, the sample vector x can now be expressed in the form given by equation (5), x=Sb+n, except that now x is a NM×1 vector, and the columns of S are the sampled truncated signatures. Typically, the columns of S contain a few leading zero entries, followed by $(N+L_k)$ non-zero entries, and ending with trailing zeros.

Because equation (23) is formally identical to equation (5), multi-user detection block 38 can operate on asynchronous signals in the same manner as was described above with respect to synchronous signals. In other words, the restriction of $\hat{b}$ to the unit circle and the application of equation (10) to find the values of $\hat{b}_k$ can be performed on asynchronous signals, as well. The performance of block 38 in the asynchronous case depends on the width of the observation window. For ideal channels and an observation window synchronized with a symbol interval of one of the users, b should typically have (2K−1) elements, compared with K elements in the synchronous case. For improved performance under non-ideal conditions, the observation window may be even wider.

Maximum Likelihood Estimation of Channel Responses

Figure 7:
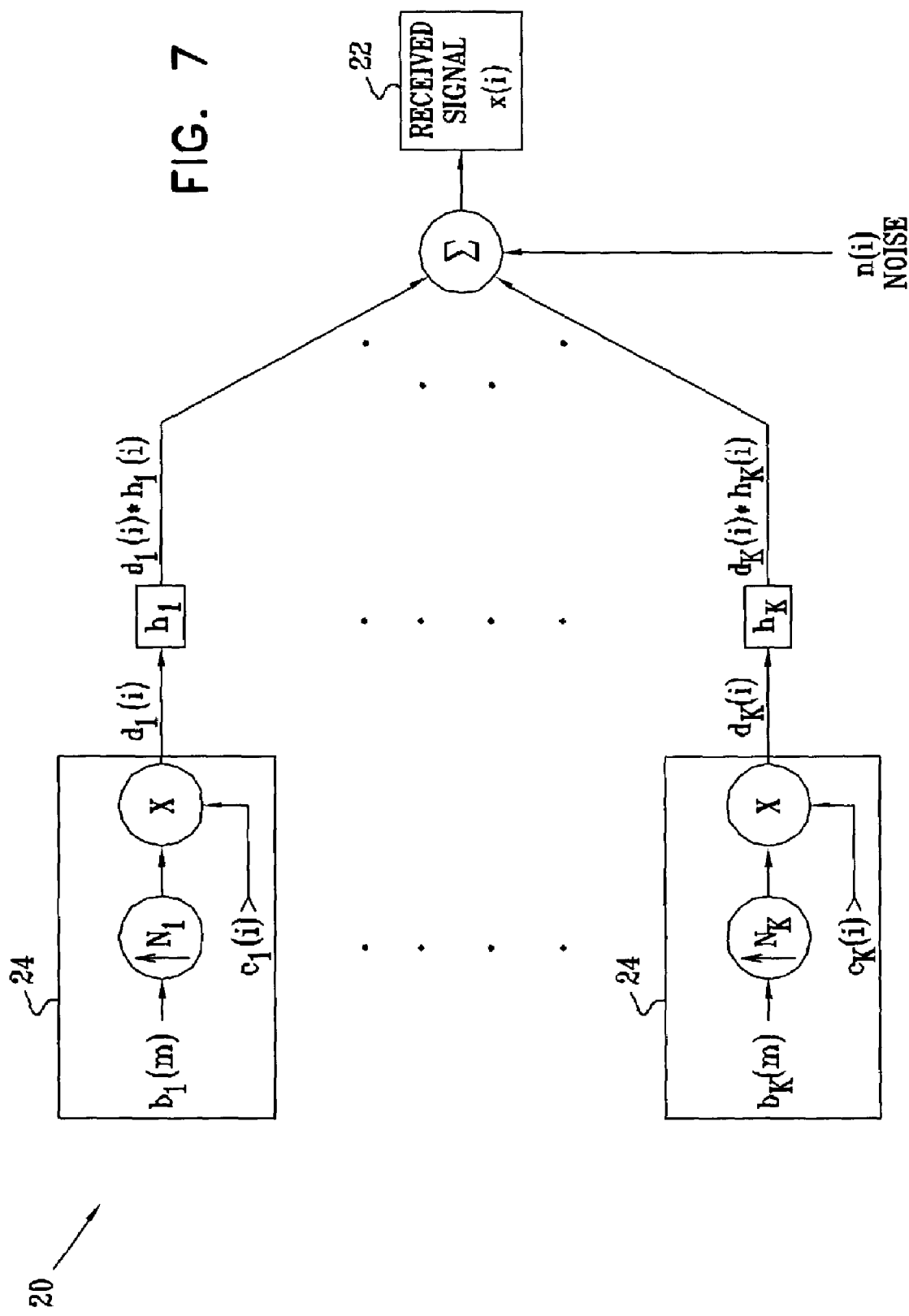
FIG. 7 is a block diagram that schematically illustrates aspects of signal generation and reception in a multi-user communication system.

FIG. 7 is a block diagram showing details of signals conveyed in system 20, which will be useful in understanding the operation of channel estimator 36 (FIG. 3). The symbols $b_k(m)$ transmitted by the k-th user 24 are up-sampled and modulated by the user's spreading code $c_k(i)$ to generate chips $d_k(i)$. Each user channel is assumed to have a linear response $h_k(i)$. The signal x(i) at the receiver of base station 22 is a superposition of all the user signals, together with noise n(i). Assuming for simplicity that the receiver samples the superposed signal at the chip rate, the received baseband signal can be represented as:

$$x(i) = \sum_{k=1}^{K} h_k(i) * d_k(i) + n(i) \quad (24)$$

This equation is a simplified form of equation (1). Note that higher sampling rates may also be used, as described further hereinbelow.

Equation (2) can likewise be recast to express the chips $d_k(i)$ as a function of the spreading gain (or spreading response) $N_k$ and the code sequence $c_k(i)$ $$d_k(i) = \sum_{m=-\infty}^{\infty} b_k(m) w_{N_k}(i - mN_k - T_k) c_k(i) \quad (25)$$

Here $T_k$ is an integer between 1 and $N_k$ that indicates the symbol start-time, and $w_{N_k}$ is a rectangular window function, which is 1 for i in [1, $N_k$), and zero elsewhere. We refer to the product $s_{N_k}(i-mN_k-T_k)c_k(i)$ as the "signature" of symbol $b_k(m)$. Channel estimator 36 (or some other element of the receiver) typically performs a clock recovery function to determine $T_k$ for each user.

The problem to be solved by channel estimator 36 can be stated as follows: Given a vector x of M consecutive samples x(i) of the signal received at base station 22, estimate the channel impulse responses $h_k(i)$ for all user channels k. For the purposes of the estimation, the channel impulse responses are assumed to be finite in time (i.e., FIR) and constant over each observation interval, i=1, . . . , M, so that equation (24) can be rewritten as:

$$x(i) = \sum_{k=1}^{K} d_k^T(i) h_k + n(i) \quad (26)$$

Here the superscript T indicates the transpose of a vector and $d_k(i):=(d_k(i), d_k(i-1), \ldots, d_k(i-L_k+1))^T$, wherein $L_k$ is the length of the channel vector $h_k:=(h_k(1), h_k(2), \ldots, h_k(L_k))^T$. Preferably, for accurate estimation of $h_k$, M is chosen to be considerably greater than $$\sum_{k=1}^{K} L_k.$$

It is also assumed that the code sequences $\{c_k(i)\}$ are independent of the symbols and consist of independent identically-distributed complex random variables with zero mean. All the code sequences are assumed to be known at the receiver, and are mutually orthogonal. This is a reasonable assumption with the regard to the long PN spreading codes used in IS-95 and other modern CDMA standards. For simplicity in the derivation that follows, we assume that users 24 apply BPSK modulation. Other alphabets may also be used with minor modifications to the channel estimator, as described below. When BPSK modulation is used, the chip sequences $\{d_k(i)\}$ are also mutually orthogonal.

Based on equation (26), the vector x of received samples can be expressed as x=Dh+n, wherein h:=$(h_1^T, \ldots, h_K^T)^T$, and the chip matrix D is given by:

$$D:=[D_1, \ldots, D_K] \quad (27)$$

$$D_k:=[d_k^T(1), \ldots, d_k^T(M)]^T$$

It can be seen from equation (25) that the elements of the chip matrix depend on the (unknown) symbols $\{b_k(m)\}$.

Channel estimator 36 performs a maximum likelihood estimation (MLE) of h by maximizing a log-likelihood function given by:

$$L(b, h) = -\|x - Dh\|^2 \quad (28)$$

over the unknown parameters b and h. The solution to equation (28) for any fixed b is given by:

$$\hat{h} = (D^H D)^{-1} D^H x \quad (29)$$

Based on the mutual orthogonality of the chip sequences noted above (and hence the mutual orthogonality of the columns of D), $D^H D \approx MI$ for large M, wherein I is the identity matrix. Substituting equation (29) back into equation (28) then gives:

$$L(b) \approx \|D^H x\|^2 = \sum_{k=1}^{K} \|D_k^H x\|^2 \quad (30)$$

L(b) can be cast as an explicit function of b by using the definition of $d_k(i)$ in equation (25):

$$D_k = \sum_{m \in B_k} b_k(m) C_k(m) \quad (31)$$

$B_k$ represents the set of symbols that affect $D_k$, i.e., those symbols having non-zero matrix elements in the signature matrix $C_k(m)$ for user k. The signature matrix is a M×$L_k$ Toeplitz matrix. The elements of the signature matrix are completely determined by the transmitted signature of the symbol $b_k(m)$, as described above in reference to equation (25). In other words, the i-th entry in the first column of $C_k$ is the signature $w_{N_k}(i-mN_k-T_k)c_k(i)$. Subsequent columns contain delayed versions of this signature, so that the i-th entry in the j-th column of $C_k$ is $w_{N_k}(i-j-mN_k-T_k)c_k(i-j)$.

The overall form of the signature matrix is as follows:

$$C_k(m) = \begin{bmatrix} 0 & 0 & \cdots & 0 \\ \vdots & \vdots & \cdots & \vdots \\ 0 & 0 & \cdots & 0 \\ c_k(mN_k+T_k+1) & 0 & \cdots & 0 \\ c_k(mN_k+T_k+2) & c_k(mN_k+T_k+1) & \cdots & 0 \\ \vdots & c_k(mN_k+T_k+2) & \cdots & 0 \\ \vdots & \vdots & \cdots & c_k(mN_k+T_k+1) \\ c_k(mN_k+T_k+N_k) & \vdots & \cdots & c_k(mN_k+T_k+2) \\ 0 & c_k(mN_k+T_k+N_k) & \cdots & \vdots \\ 0 & 0 & \cdots & \vdots \\ 0 & 0 & \cdots & c_k(mN_k+T_k+N_k) \\ 0 & 0 & \cdots & 0 \\ \vdots & \vdots & \cdots & \vdots \\ 0 & 0 & \cdots & 0 \end{bmatrix}$$

Substituting equation (31) into equation (30) gives the following expression for the likelihood function:

$$L(b) = \sum_k \left\| \sum_{m \in B_k} f_k(m) b_k^*(m) \right\|^2 \quad (32)$$

$f_k$ is a "fingerprint vector" of length $L_k$, matched to the signature of the (k,m)-th symbol, which is given by:

$$f_k(m) := C_k^H(m) x \quad (33)$$

Collecting the consecutive symbols $\{b_k(m)\}$ for all $m \in B_k$ into a column vector $b_k$, and collecting the corresponding fingerprints into a $L_k \times |B_k|$ fingerprint matrix $F_k$ (wherein $|B_k|$ is the number of elements in the set $B_k$), allows equation (32) to be rewritten as:

$$L(b) = \sum_k \| F_k b_k^* \|^2 \quad (34)$$

Since the symbol vectors $b_k$ are separate and independent, equation (34) is maximized over b simply by maximizing each of the individual user components of L(b), i.e., for each k, finding $b_k$ to maximize:

$$L_k(b_k) := \| F_k b_k^* \|^2 \quad (35)$$

Preferably, the maximization is carried out over the known alphabet A of the symbol constellation.

Figure 8:
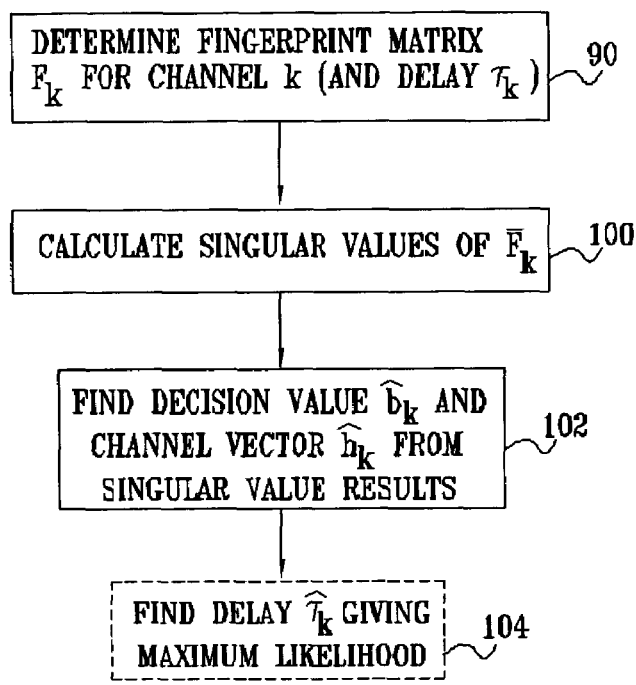
FIG. 8 is a flow chart that schematically illustrates a method for channel estimation in a multi-user communication system, in accordance with a preferred embodiment of the present invention.
Figure 9:
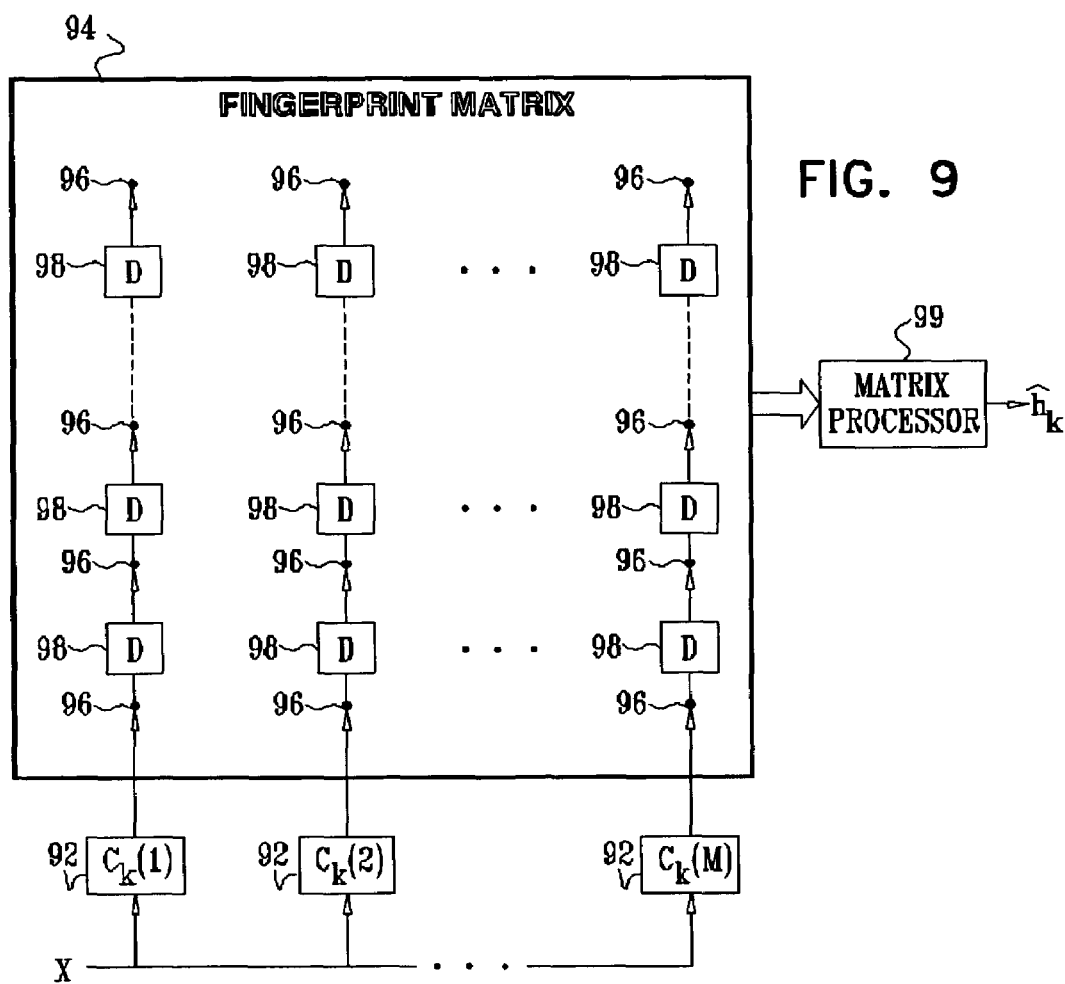
FIG. 9 is a block diagram that schematically illustrates circuitry for channel estimation and tracking, in accordance with a preferred embodiment of the present invention.

Reference is now made to FIGS. 8 and 9, which schematically illustrate a method used by channel estimator 36 to determine the channel response vector $h_k$ for each channel k, based on the fingerprint matrices $F_k$, in accordance with a preferred embodiment of the present invention. FIG. 8 is a flow chart showing the method itself, while FIG. 9 is a block diagram showing a portion of the circuitry that may be used to implement the method in the channel estimator.

The method of FIG. 8 begins with calculation of the fingerprint matrix $F_k$ for each user channel, at a matrix calculation step 90. (In order to determine the propagation delay $\tau_k$ between the transmitter of user k and the base station receiver, a number of matrices may be calculated, each for a different value of $\tau_k$, as described further hereinbelow.) To calculate the fingerprints $f_k$ for successive symbols $b_k(1), \ldots, b_k(M)$, the received samples x(i) are input to a bank of matched filters 92, as shown in FIG. 9. Filters 92 have coefficients corresponding to the elements of the columns of the signature matrices $C_k(1), \ldots, C_k(M)$. Successive products of the sample values x(i) by the filter coefficients are entered into the columns of a fingerprint matrix array 94. Each column of array 94 corresponds to the fingerprint $f_k(m)$ for one of the M symbols in the observation interval. Each of the columns comprises a sequence of taps 96, with a one-chip delay between the taps imposed by delay elements 98. Each tap holds the value of one of the elements of $F_k$.

A matrix processor 99 reads out and processes the elements of $F_k$ from taps 96 of array 94 in order to maximize $L_k(b_k)$, at a matrix processing step 100. For simplicity, as noted above, we assume for the moment that BPSK modulation is used in system 20. The, real symbol alphabet then allows equation (35) to be rewritten as follows:

$$L_k(b_k) := \| \overline{F}_k b_k^* \|^2 \quad (36)$$

Here $$\overline{F} := \begin{bmatrix} F_{\Re} \\ F_{\Im} \end{bmatrix},$$

a real matrix made by stacking the real and imaginary parts of F, in the manner of $\overline{S}$ described above. The maximization of $L_k$ over the real constellation of $b_k$ is ambiguous, in that the maximum can be determined only up to multiplication of $b_k$ by a real scalar (such as −1).

To maximize the value of equation (36) for each k, processor 99 preferably performs a singular value decomposition (SVD) of $\overline{F}_k$, as is known in the art:

$$\overline{F}_k = U_k \Sigma_k V_k^T \quad (37)$$

wherein U and V are unitary matrices, and $\Sigma$ is diagonal. Efficient methods for SVD are described in the above-mentioned text by Golub et al. Equation (36) can be maximized by setting symbol values $b_k$ to the soft decision values:

$$\tilde{b}_k = \sqrt{|B_k|} v_k(1) \quad (38)$$

Here $v_k(1)$ is the first column of $V_k$, and the scaling factor $\sqrt{|B_k|}$ is added so that the absolute values of the elements of $\tilde{b}_k$ will be close to one.

Based on the above decomposition of $\overline{F}_k$, processor 99 can determine a vector of hard decision values $\hat{b}_k$ simply by taking the sign of each element of $\tilde{b}_k$, at a decision step 102. As noted earlier, the determination of the elements of $\hat{b}_k$ is uncertain as to multiplication by ±1, and other means must be applied in order to resolve this ambiguity. (One possibility is the use of known pilot signals, as described below.) Given the hard decision values of the symbols $\hat{b}_k$, the channel response vector for each user k can be determined by substituting these values into equation (29), in which the chip matrix D has been replaced by the equivalent fingerprint matrix $F_k$:

$$\hat{h}_k = \frac{1}{M} F_k \hat{b}_k \quad (39)$$

In estimating $\hat{b}_k$ and $\hat{h}_k$ in this manner, the individual user channels are decoupled, so that each channel is estimated independently based on the superposed samples x(i) of all the channels and the spreading code of the individual channel.

Alternatively, the channel response vectors may be estimated based on the soft decision values $\tilde{b}_k$ given by equation (38). In this case:

$$\hat{h}_k = \frac{\sqrt{|B_k|\sigma_k(1)}}{M} \underline{u}_k(1) \quad (40)$$

Here $\sigma_k(1)$ is the first (i.e., largest) singular value in $\Sigma_k$, and $u_k(1)$ is the first column of $U_k$. The notation $\underline{u}$ with underbar denotes the inverse of the overbar operation used earlier, i.e., "unstacking" of u from a real vector of length 2L to a complex vector of length L. An advantage of deriving $\hat{h}_k$ directly from the fingerprint matrix $F_k$ in this manner is that it allows matrix processor 99 to update the channel response vectors easily as new samples are received, and corresponding new fingerprints are added to array 94. For example, the matrix processor may use subspace tracking methods, as are known in the art, to compute the new major singular vector $\underline{u}_k(1)$ and the corresponding singular value $\sigma_k(1)$ iteratively, based on the previous values. An efficient method for subspace tracking is described, for example, by Yang in "Projection Approximation, Subspace Tracking," *IEEE Transactions on Signal Processing* 43:1 (January, 1995), pages 95-107, which is incorporated herein by reference.

Optionally, matrix processor 99 also estimates the propagation delay $\tau_k$ of signals transmitted from user k to base station 22, at a delay estimation step 104. These delays vary depending on the distances of the users from the base station, and they may not be known a priori. One way to estimate the delay is to pad the channel response vector $h_k$ beyond the necessary length $L_k$ by adding zeroes at the ends of the vector. In estimating $\hat{h}_k$, as described above, matrix processor 99 will implicitly find an estimate of the propagation delay $\hat{\tau}_k$, and will incidentally estimate the actual response length $L_k$, as well.

An alternative method for estimating $\tau_k$ is to define a delay vector $\tau := (\tau_1, \ldots, \tau_K)^T$, and to use the delay vector as an additional parameter in the MLE. For any given vector $\tau$, the maximization of L(b,h) can be performed as described above, wherein the values of $\tau_k$ will come to bear in the relative locations of the entries in the columns of the signature matrix $C_k(m)$ (Note that each $\tau_k$ is estimated in quanta of a chip period, since sub-chip variations are implicitly estimated by $h_k$.) Using this formulation, and referring back to equation (36), the delay vector can be estimated by:

$$\tau_k = arg\ max\|F_k(\tau_k)\tilde{b}_k(\tau_k)\|^2 \quad (41)$$

To perform the estimation, a number of different fingerprint matrices $F_k$ are preferably calculated for different values of $\tau_k$, at step 90 in the method of FIG. 8. Typically, the uncertainty in the propagation delay is small enough so that only a few different delay values need to be considered. Furthermore, since the fingerprint matrices for successive values of $\tau_k$ share a common sub-matrix, the subspace tracking function of matrix processor 99 can be used to find the singular vectors and values of the successive matrices efficiently. Thus, it is generally possible to maximize the estimation of equation (41) exhaustively over $\tau_k$ at low computational cost.

Channel estimator 36 and the method described above can also be used when the received signal x(t) is sampled at a rate that is a multiple of the chip rate. Taking the sampling multiple to be J, the channel estimator will receive M×J samples during an observation interval of M chip periods. The basic model that x=Dh+n can be re-expressed as $x^{(j)} = Dh^{(j)} + n^{(j)}$, wherein $x^{(j)} = [x(j), x(J+j), \ldots, x((M-1)J+j)]^T$. In other words, each $x^{(j)}$ contains the samples for the j-th sub-chip, and the channel vector $h^{(j)}$ and noise vector $n^{(j)}$ are defined accordingly. The fingerprint matrix $F_k$ is now a $JL_k \times |B_k|$ matrix, which is generated by stacking the sub-chip fingerprint matrices $F_k^{(j)}$:

$$F_k = \begin{bmatrix} F_k^{(1)} \\ \vdots \\ F_k^{(J)} \end{bmatrix} \quad (42)$$

The decision values $\hat{b}_k$ and $\hat{h}_k$ are determined based on this extended fingerprint matrix substantially as described above.

This same technique may be used in estimating the channel response vectors when base station 22 has multiple receive antennas. Multiple antennas are commonly deployed in order to enhance signal reception by means of spatial diversity. In this case, each $x^{(j)}$ represents the signal samples received by the j-th antenna. The fingerprint matrix for the multiple antennas is constructed in the manner of equation (42), and the decision values are determined accordingly.

Although for the sake of simplicity, the operation of estimator 36 is described above with respect to BPSK modulation, the method of FIG. 8 may be adapted in a straightforward way for other constellations, including complex-valued constellations. For example, when QPSK modulation is used, equation (31) should be recast as follows:

$$D_k = \sum_{m \in B_k} \left[ b_{k\Re}(m) c_{k\Re}(m) + j b_{k\Im}(m) c_{k\Im}(m) \right] \quad (43)$$

There are now two code matrices in the equation: $C_{k\Re}$ and $C_{k\Im}$, corresponding to the real and imaginary parts of the symbol sequences $b_{k\Re}$ and $b_{k\Im}$. The fingerprint matrix $F_k$ accordingly has twice the number of columns as in the BPSK case. In other respects, matrix processor 99 estimates the channel response vectors substantially as described above.

Figure 10:
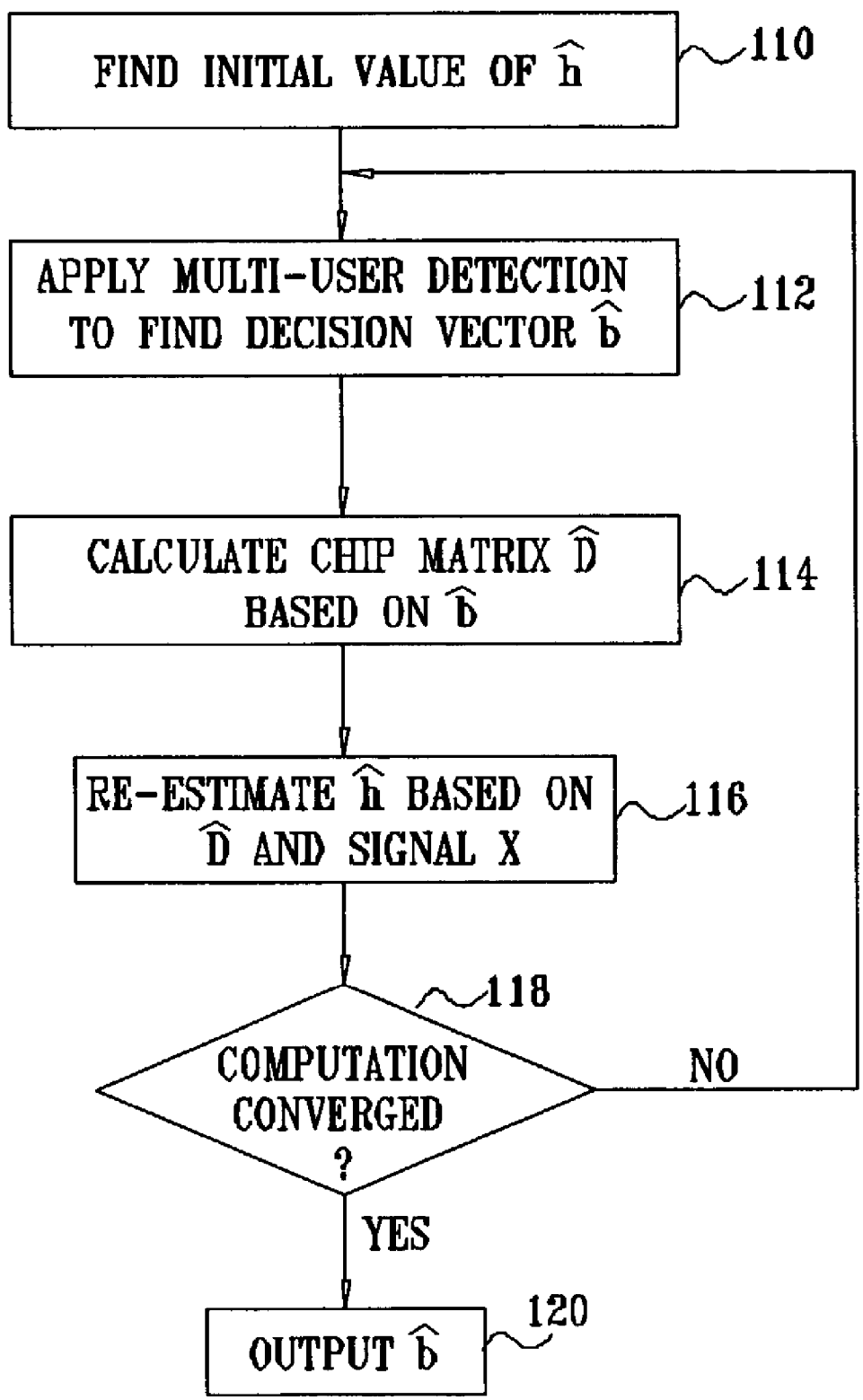
FIG. 10 is a flow chart that schematically illustrates a method for channel estimation and multi-user detection based on alternate-searching likelihood maximization (ASLM), in accordance with a preferred embodiment of the present invention.

FIG. 10 is a flow chart that schematically illustrates a method for channel estimation and multi-user detection based on alternate-searching likelihood maximization (ASLM), in accordance with a preferred embodiment of the present invention. This method is carried out in collaboration between channel estimator 36 and multi-user detection block 38. It begins from the initial estimate of $\hat{h}$ determined by estimator 36 using the method of FIG. 8, at an initialization step 110. As noted above, this value is an approximation made for each user channel k in a manner that is decoupled from the other channels.

To refine the estimated channel response vectors, multi-user detection block 38 first computes decision values of b̂, at a symbol estimation step 112. Referring back to equations (5) and (6), we recall that the signature matrix S is a function of h. The function of block 38 at step 112 is to find b̂ so as to minimize $\|x-S(\hat{h})b\|^2$. This operation is preferably carried out as described above with reference to FIGS. 4 and 6. Alternatively, if the symbol constellation is real-valued, the multi-user detector described in the above-mentioned U.S. patent application Ser. No. 09/917,837 may be used. Other multi-user detectors known in the art may be used here, as well. Further alternatively, other methods of multi-user detection may be used, as are known in the art.

Once b̂ is known, it can be used to calculate the estimated values of chips $d_k(i)$, as given by equation (25), at a chip calculation step 114. The chip values are in turn used to construct the estimated chip matrix $\hat{D}:=D(\hat{b})$, based on equation (27). The chip matrix can now be used to find a new estimate of ĥ, based on equation (29), at a channel re-estimation step 116. The procedure of steps 112, 114 and 116 continues iteratively until the values of b̂ have converged, at a convergence step 118. Convergence may be measured, for example, based on the number of symbols whose values have changed in b̂ from one iteration to the next. Once the computation has converged, detector 38 outputs the values of b̂, at an output step 120. An accurate channel estimate ĥ has been computed and can be output at the same time.

Accurate computation of ĥ at step 116 requires inversion of the matrix $\hat{D}^H\hat{D}$, which may be computationally difficult. Instead, ĥ can be determined by solving the linear equation Rĥ=y, wherein $R:=\hat{D}^H\hat{D}$ and $y:=\hat{D}^Hx$. Since a good initial guess for ĥ is available, this equation can be efficiently solved using standard iterative methods, such as the Gauss-Seidel or conjugate gradient algorithms described in the above-mentioned text by Golub et al. These methods do not require explicit inversion of R.

In some cellular systems, users 24 transmit a known pilot sequence $p_k(i)$ along with the data-bearing traffic chip sequence $d_k(i)$ defined by equation (25). The pilot sequence can be used to enhance the channel estimation, including resolving the sign ambiguity of the estimated symbols noted above. In the presence of the pilot signal, the model x=Dh+n, as expressed by equation (26), is now recast as x=(D+P)h+n. Here P is a known matrix composed of the pilot chips, given by $P=[P_1, \ldots, P_K]$, $$p_k = \begin{bmatrix} p_k^T(1) \\ \vdots \\ p_k^T(M) \end{bmatrix} \tag{44}$$

and $p_k(i):=[p_k(i), p_k(i-1), \ldots, p_k(i-L+1)]^T$, in analogy to $d_k(i)$.

The MLE function of equation (36) is now given by:

$$L_k(b_k) := \left\| [\Pi_k F_k] \begin{bmatrix} 1 \\ b_k \end{bmatrix} \right\|^2 \tag{45}$$

Here $F_k$ is the fingerprint matrix defined above, taken in the absence of pilot signals. The fingerprint matrix is extended by the pilot fingerprint, given by $n_k=P_k^H x$. Applying the SVD of equation (37) to $\overline{n_k F_k}$ gives a soft decision value (assuming BPSK modulation):

$$\tilde{b}_k = sign(V_k(1,1))(\sqrt{|B_k|+1})\dot{v}_k(1) \tag{46}$$

By comparison with equation (38), it can be seen that the sign ambiguity of the estimated symbol vector is now resolved by $V_k(1,1)$, which is the first entry in the first column of the matrix $V_k$. $\dot{v}_k(1)$ represents the first column of $V_k$, without the first entry $V_k(1,1)$. The hard decision values of $\hat{b}_k$ are given simply by the sign of the corresponding soft decision values, and the channel estimate is:

$$\hat{h}_k = \frac{1}{(1+\beta)M}(F_k \hat{b}_k + \Pi_k) \tag{47}$$

wherein β is the (known) ratio of pilot signal power to data traffic signal power.

The symbol decision values and pilot-based channel response estimates are preferably refined using the ASLM procedure of FIG. 10, with appropriate modification, The known pilot signals are removed from the received signals x(i) to give a "pilot-free" input, x−Pĥ to multi-user detection block 38 at step 112. The detection block then finds b̂ so as to maximize $\|(x-P\hat{h})-S(\hat{h})b\|^2$. After computation of the chip matrix D̂ at step 114, the channel estimate is updated at step 116 using:

$$\hat{h}=((\hat{D}+P)^H(\hat{D}+P))^{-1}(\hat{D}+P)^H x \tag{48}$$

The procedure continues through steps 118 and 120, as described above.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for channel estimation, comprising:
  receiving an input signal due to a superposition of waveforms encoding symbols transmitted respectively by a plurality of transmitters in a common frequency band, wherein each transmitter among the plurality of transmitters modulates the symbols with a respective spreading code;
  sampling the input signal at sampling intervals over the duration of an observation period to provide a sequence of samples;
  processing the sequence of samples to generate a respective initial estimate of a channel response for each of the transmitters by maximizing, individually for each of the transmitters and based on the respective spreading code of the transmitter, a likelihood of correctly decoding the transmitted symbols using the estimated channel response;
  based on the initial estimate, determining decision values corresponding to the symbols transmitted by each of the transmitters;
  re-estimating the channel response for each of the transmitters based on the decision values of the symbols; and
  decoding the symbols transmitted by the plurality of transmitters using the re-estimated channel response.

2. A method according to claim 1, wherein processing the sequence of complex samples comprises:
computing respective fingerprints of the transmitters, based on the respective spreading code and the sequence of samples; and
determining the channel response for each of the transmitters so as to maximize a product of the respective fingerprints with decision values of the symbols transmitted by the transmitter.

3. A method according to claim 2, wherein determining the channel response comprises assembling a respective matrix of the fingerprints for each of the transmitters, and finding a singular value decomposition (SVD) of the respective matrix.

4. A method according to claim 3, wherein finding the SVD comprises deriving a unitary matrix from the matrix of the fingerprints, and estimating the channel response based on the unitary matrix.

5. A method according to claim 4, wherein estimating the channel response comprises determining the decision values of the symbols based on the unitary matrix, and computing the estimated channel response from the decision values.

6. A method according to claim 4, wherein estimating the channel response comprises computing the estimated channel response based on the unitary matrix and on a singular value determined by the SVD.

7. A method according to claim 3, wherein the transmitters transmit known pilot signals in addition to the encoded symbols, and wherein assembling the respective matrix comprises augmenting the matrix to account for the pilot signals, and wherein finding the SVD comprises computing the SVD of the augmented matrix so as to estimate the channel response using the pilot signals.

8. A method according to claim 2, wherein the symbols belong to a real-valued constellation, and wherein determining the channel response comprises maximizing the product of the respective fingerprints with the decision values while restricting the decision values to real values.

9. A method according to claim 1, wherein processing the sequence of complex samples comprises estimating a respective delay time for each of the transmitters by maximizing the likelihood of correctly decoding the transmitted symbols over a range of possible delay times.

10. A method according to claim 1, wherein sampling the input signal comprises generating the samples at a sample rate that is substantially equal to a chip rate of the spreading code.

11. A method according to claim 1, wherein sampling the input signal comprises generating the samples at a sample rate that is substantially greater than a chip rate of the spreading code.

12. A method according to claim 1, wherein receiving the input signal comprises receiving the signal through multiple antennas, and wherein processing the sequence of complex samples comprises estimating the channel response from each of the transmitters to each of the multiple antennas.

13. A method according to claim 1, wherein the waveforms comprise code-division multiple access (CDMA) waveforms.

14. A method according to claim 1, wherein the spreading codes comprise complex-valued codes.

15. A method according to claim 1, wherein re-estimating the channel response comprises iteratively repeating the steps of processing the sequence of complex samples to determine the decision values and re-estimating the channel response until a convergence criterion is satisfied.

16. A method according to claim 1, wherein the transmitted symbols belong to a predetermined constellation, and wherein processing the sequence of complex samples to determine the decision values comprises finding soft decision values corresponding to the symbols while constraining the soft decision values to a range of values to which the constellation belongs, and projecting the soft decision values onto the constellation to estimate the transmitted symbols.

17. A method according to claim 16, wherein the constellation is real-valued, and wherein constraining the soft decision values comprises requiring the soft decision values to be real.

18. A method according to claim 16, wherein the symbols in the constellation have a fixed magnitude and a variable phase, and wherein constraining the soft decision values comprises constraining the soft decision values to a circle in a complex plane.

19. A method according to claim 1, wherein the transmitters transmit known pilot signals in addition to the encoded symbols, and wherein processing the sequence of complex samples to estimate the channel response comprises estimating the channel response using the pilot signals, and wherein processing the sequence of complex samples to determine the decision values comprises estimating the decision values independent of the pilot signals.

20. A multi-user receiver, comprising:
input circuitry, coupled to receive an input signal due to a superposition of waveforms encoding symbols transmitted respectively by a plurality of transmitters in a common frequency band, wherein each transmitter among the plurality of transmitters modulates the symbols with a respective spreading code, and to sample the input signal at sampling intervals over the duration of an observation period to provide a sequence of samples;
channel estimation circuitry, coupled to receive and process the sequence of samples so as to estimate a channel response for each of the transmitters by maximizing, individually for each of the transmitters and based on the respective spreading code of the transmitter, a likelihood of correctly decoding the transmitted symbols using the estimated channel response; and
multi-user detection circuitry, which is arranged to process the sequence of samples using the estimated channel response for all the transmitters to determine decision values corresponding to the symbols transmitted by each of the transmitters,
wherein the channel estimation circuitry is arranged to re-estimate the channel response for each of the transmitters based on the decision values of the symbols, for use by the multi-user detection circuitry in decoding the symbols.

21. A receiver according to claim 20, wherein the channel estimation circuitry is arranged to compute respective fingerprints of the transmitters, based on the respective spreading code and the sequence of samples, and to determine the channel response for each of the transmitters so as to maximize a product of the respective fingerprints with decision values of the symbols transmitted by the transmitter.

22. A receiver according to claim 21, wherein the channel estimation circuitry is arranged to determine the channel response by assembling a respective matrix of the fingerprints for each of the transmitters, and finding a singular value decomposition (SVD) of the respective matrix.

23. A receiver according to claim 22, wherein the channel estimation circuitry is arranged to derive a unitary matrix from the matrix of the fingerprints, and to estimate the channel response based on the unitary matrix.

24. A receiver according to claim 23, wherein the channel estimation circuitry is arranged to determine the decision values of the symbols based on the unitary matrix, and to compute the estimated channel response from the decision values.

25. A receiver according to claim 23, wherein the channel estimation circuitry is arranged to compute the estimated channel response based on the unitary matrix and on a singular value determined by the SVD.

26. A receiver according to claim 22, wherein the transmitters transmit known pilot signals in addition to the encoded symbols, and wherein the channel estimation circuitry is arranged to augment the matrix to account for the pilot signals, and to compute the SVD of the augmented matrix so as to estimate the channel response using the pilot signals.

27. A receiver according to claim 21, wherein the symbols belong to a real-valued constellation, and wherein the channel estimation circuitry is arranged to determine the channel response by maximizing the product of the respective fingerprints with the decision values while restricting the decision values to real values.

28. A receiver according to claim 20, wherein the channel estimation circuitry is arranged to estimate a respective delay time for each of the transmitters by maximizing the likelihood of correctly decoding the transmitted symbols over a range of possible delay times.

29. A receiver according to claim 20, wherein the input circuitry is arranged to sample the input signal at a sample rate that is substantially equal to a chip rate of the spreading code.

30. A receiver according to claim 20, wherein the input circuitry is arranged to sample the input signal at a sample rate that is substantially greater than a chip rate of the spreading code.

31. A receiver according to claim 20, wherein the input circuitry is coupled to receive the input signal through multiple antennas, and wherein the channel estimation circuitry is arranged to estimate the channel response from each of the transmitters to each of the multiple antennas.

32. A receiver according to claim 20, wherein the waveforms comprise code-division multiple access (CDMA) waveforms.

33. A receiver according to claim 20, wherein the spreading codes comprise complex-valued codes.

34. A receiver according to claim 20, wherein the multi-user detection circuitry and the channel estimation circuitry are arranged to iteratively repeat determining the decision values and re-estimating the channel response until a convergence criterion is satisfied.

35. A receiver according to claim 20, wherein the transmitted symbols belong to a predetermined constellation, and wherein the multi-user detection circuitry is arranged to find soft decision values corresponding to the symbols while constraining the soft decision values to a range of values to which the constellation belongs, and to project the soft decision values onto the constellation to estimate the transmitted symbols.

36. A receiver according to claim 35, wherein the constellation is real-valued, and wherein the multi-user detection circuitry is arranged to constrain the soft decision values to be real.

37. A receiver according to claim 35, wherein the symbols in the constellation have a fixed magnitude and a variable phase, and wherein the multi-user detection circuitry is arranged to constrain the soft decision values to a circle in a complex plane.

38. A receiver according to claim 20, wherein the transmitters transmit known pilot signals in addition to the encoded symbols, and wherein the channel estimation circuitry is arranged to estimate the channel response using the pilot signals, and wherein the multi-user detection circuitry is arranged to estimate the decision values independent of the pilot signals.

* * * * *